(12) United States Patent
Desch et al.

(10) Patent No.: US 11,118,966 B2
(45) Date of Patent: Sep. 14, 2021

(54) MEASURING DEVICE FOR CAPTURING AMBIENT LIGHT, RAIN-LIGHT SENSOR FOR USE ON A WINDSHIELD AND MOTOR VEHICLE

(71) Applicant: HELLA GmbH & Co. KGaA, Lippstadt (DE)

(72) Inventors: Eduard Desch, Hude-Wüsting (DE); Viktor Gerliz, Oldenburg (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 16/818,497

(22) Filed: Mar. 13, 2020

(65) Prior Publication Data

US 2020/0292381 A1  Sep. 17, 2020

(30) Foreign Application Priority Data

Mar. 14, 2019  (DE) ...................... 10 2019 106 544.5

(51) Int. Cl.
*G01J 1/42* (2006.01)
*B60R 11/00* (2006.01)
*G01J 1/04* (2006.01)

(52) U.S. Cl.
CPC ............. *G01J 1/4204* (2013.01); *B60R 11/00* (2013.01); *G01J 1/0422* (2013.01); *G01J 1/0425* (2013.01)

(58) Field of Classification Search
CPC ...... G01J 1/0422; G01J 1/0425; G01J 1/4204; B60R 11/00
See application file for complete search history.

(56) References Cited

U.S. PATENT DOCUMENTS

| 4,111,561 A | 9/1978 | Plummer |
| 2017/0067776 A1* | 3/2017 | Makino ................. G01J 1/0266 |

FOREIGN PATENT DOCUMENTS

| DE | 19630216 C2 | 5/1998 |
| DE | 10 2012 003 576 A1 | 8/2013 |
| DE | 10 2015 001 800 A1 | 8/2016 |
| DE | 10 2015 113 990 A1 | 3/2017 |
| JP | H06- 160 182 A | 6/1994 |

OTHER PUBLICATIONS

VDI-Fachbereich Produktionstechnik und Fertigungsverfahren; *VDI 3400 Electrical Discharge Machining (DEM)—Definitions, processes, application;* VDI-Handbuch Produktionstechnik und Fertigungsverfahren—Band 2: Fertigungsverfahren; Jun. 1975; pp. 1-26; Dusseldorf, Germany.

* cited by examiner

*Primary Examiner* — Kevin K Pyo

(74) *Attorney, Agent, or Firm* — Muncy, Geissler, Olds & Lowe, P.C.

(57) ABSTRACT

In a measuring device for capturing ambient light for use in a motor vehicle, having a light-sensitive detector and an optical element, which is provided and formed to direct ambient light onto the detector, it is essential to the invention that the optical element has an outer lateral surface, a light entry side and a light emission side and that at least one of the two sides, light entry side or light emission side, has a curved surface. The curved surface is at least partially roughened and has a higher roughness than the lateral surface of the optical element.

20 Claims, 3 Drawing Sheets

Figure 1:
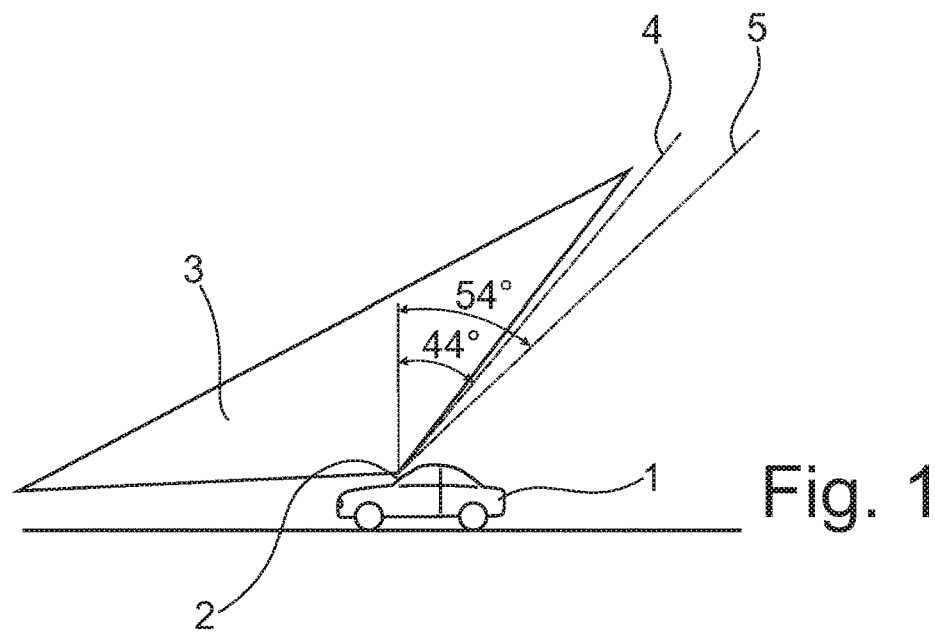

MEASURING DEVICE FOR CAPTURING AMBIENT LIGHT, RAIN-LIGHT SENSOR FOR USE ON A WINDSHIELD AND MOTOR VEHICLE

The invention relates to a measuring device for capturing ambient light for use in a motor vehicle, having a light-sensitive detector and an optical element, which is provided and formed to direct ambient light onto the detector. Furthermore, the invention relates to a rain-light sensor for use on a windshield of a motor vehicle having a sensor for detecting water drops on the windshield and a measuring device for capturing ambient light. The invention also relates to a motor vehicle having a windshield and a measuring device arranged on the inside of the windshield for capturing ambient light.

A vehicle having a light control that depends on the driving situation has been described in DE 196 30 216 C2. The vehicle there has two sensors, namely an ambient light sensor directed upwards and a light sensor specifically directed in the travel direction having a narrower detection cone pointing in the travel direction.

A generic measuring device is described in DE 10 2012 03 576 A1. Sensors for detecting the ambient light and for detecting the forefield are integrated in a housing there. The cover is formed as an optical element, at least in subregions, and the ambient light is focused onto the detector.

A further measuring device for capturing the ambient light having an optical element, namely here a diffuser formed as a coating, is known from DE 10 2015 001 800 A1.

The invention has for its object to provide a measuring device of the type mentioned above, with which the ambient light can be captured in a particularly large opening cone.

This object is achieved using a measuring device having the features of patent claim 1 or a rain-light sensor having the features of claim 14 and a motor vehicle having the features of claim 16. Preferred embodiments of the invention are described in the dependent claims.

In a measuring device for capturing ambient light for use in a motor vehicle, having a light-sensitive detector and an optical element, which is provided and formed to direct ambient light onto the detector, it is essential to the invention that the optical element has an outer lateral surface and a light entry side and a light emission side, that at least one of the two sides, light entry side or light emission side, has a curved surface and that the curved surface is roughened at least at 50% of its surface and has a higher roughness than the lateral surface of the optical element, so that the incoming light is scattered on the curved surface and that the curved surface is formed as an inner contour that forms a recess in the optical element.

With the configuration of the measuring device according to the invention, the ambient light can be captured from a half-space in a moving vehicle with an opening cone in elevation (at azimuth 0°) or in azimuth (at elevation 90°) in an angular range of over 120° (at 50% sensitivity). The effective, up to 10% sensitive range, is even above 130°. This enables effective light collection both at a flat angle of entry of the sun's rays when the sun is low in front of the vehicle, as well as light collection up to 54° behind the vehicle. Due to the effect of light scatter exploited by the roughness, the effects caused by unevenness or production inaccuracies are also averaged and the entire measuring device becomes insensitive to positional tolerances of the electronics in a large range.

The measuring device according to the invention implements a lens structure which has a scattering, optical contour. The light entering the optical element is then directed to the detector both by the lateral surface, that is, by reflection on the inner sides of the outer contour, and by the curved surface.

The optical element is preferably an optical fiber. Its lateral surface forms the outer contour, which in particular conducts steeply sloping or vertical light components to the detector.

The curved surface is formed as an inner contour, which forms a recess in the optical element. The inner contour is preferably formed symmetrical, in particular mirror-symmetrical to a central axis. The inner contour particularly preferably has the shape of a cone rounded at the tip. Due to the roughness, which is preferably generated by eroding, the inner contour ensures that the incoming light generates a uniformly illuminated light spot due to the scattering. The inner contour can also be described as similar to a Gaussian shape. The superimposition of the light that is reflected on the outer contour and the light that is scattered on the inner contour ensures that the angle-dependent signal characteristic generates a continuously formed bimodal plateau with a large opening cone. This maximizes the cone of vision of the sensor in the motor vehicle.

The recess which forms the inner contour is preferably arranged on the side of the optical element which faces the detector.

The roughness of the curved surface, in particular the inner contour, is preferably greater than 1 µm, preferably greater than 2 µm and particularly preferably greater than 4 µm. The roughness is preferably generated by eroding the surface. However, the roughness is preferably less than 15 µm. The mean roughness in this case is referred to as Ra. The roughness of the curved surface, in particular the inner contour, is preferably in the range of classes 21 to 42 according to VDI 3400, in particular in the range of classes 33 to 42 according to VDI 3400.

The optical element is preferably formed as an optical fiber. However, the lateral surface of the optical element preferably has a roughness between 0.01 µm and 0.5 µm, in particular between 0.01 µm and 0.05 µm. This specification also refers to the average roughness Ra.

The inner contour has more than 50%, in particular completely, higher roughness than the lateral surface of the optical element, in particular, the surface has more than 50% and in particular completely, roughness corresponding to the average roughness Ra described above.

In a particularly preferred embodiment, the inner contour extends over almost the entire height of the optical element. The inner contour extends over heights between 50% and 80% in variants. However, the height of the inner contour preferably extends over regions between 80% and 100% of the optical element, preferably over regions between 95% and 100% of the optical element.

In another preferred embodiment, the inner contour extends, in the region of its greatest lateral extent, which is typically on the side that is associated with the detector, over almost the entire width of the optical element. The inner contour preferably extends over at least more than 50%, in particular over more than 70% and in particular over more than 90% of the width of the optical element.

In a further preferred embodiment of the invention, the light entry surface of the optical element has a higher roughness than the lateral surface of the optical element. The light entry surface of the optical element is preferably curved. Particularly preferably, in addition to the curved, roughened light entry surface, the optical element additionally has the roughened inner contour, wherein the curved light entry surface is curved upwards, that is, toward the light entry side, and in this respect is curved in the same direction as the recess. In another preferred embodiment, the light entry surface is curved downwards, that is, in the direction of the light emission side, and roughened.

A further aspect of the invention consists in the provision of a rain-light sensor for use on a windshield of a motor vehicle having a sensor for detecting water drops on the windshield and a measuring device for capturing the ambient light, in which it is essential to the invention that the measuring device for capturing the ambient light has the measuring device described above. A particularly good capturing of the ambient light is made possible over a wide range with such a rain-light sensor. The measuring device is also used according to the invention in forefield light sensors and combined solar-climate sensors, in particular in vehicles.

A light sensor specific to the travel direction with a detection cone pointing in the travel direction is preferably also arranged in the rain-light sensor.

A further aspect of the invention relates to the provision of a motor vehicle having a windshield and a measuring device arranged on the inside of the windshield for capturing the ambient light, wherein the measuring device for capturing the ambient light is the measuring device described above. The motor vehicle preferably has the rain-light sensor described above or a forefield light sensor or a combined solar-climate sensor.

Figure 2:
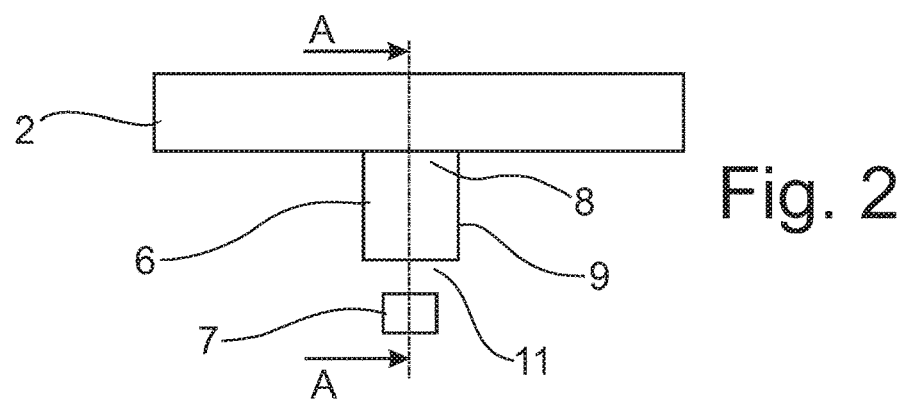
Figure 3:
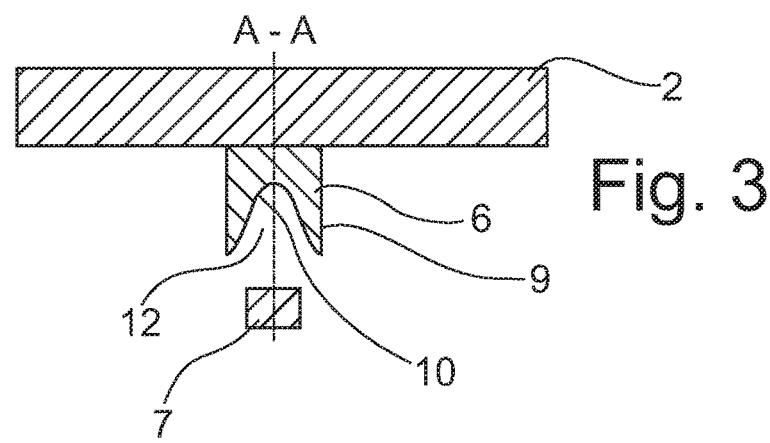
Figure 4:
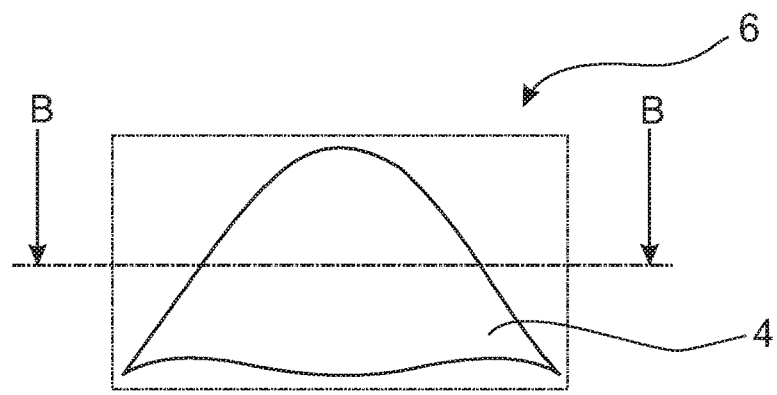
Figure 5:
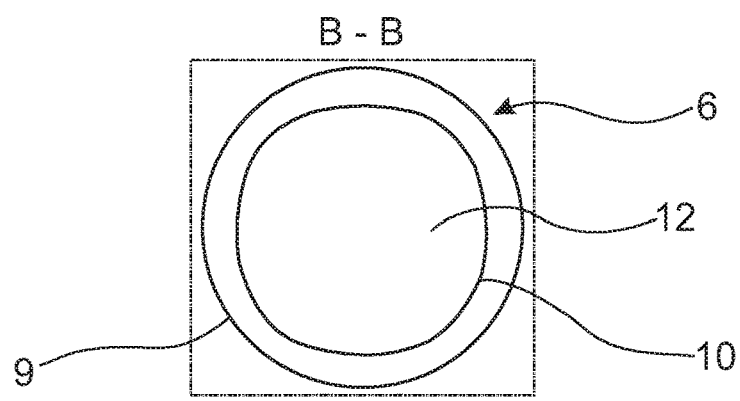
Figure 6:
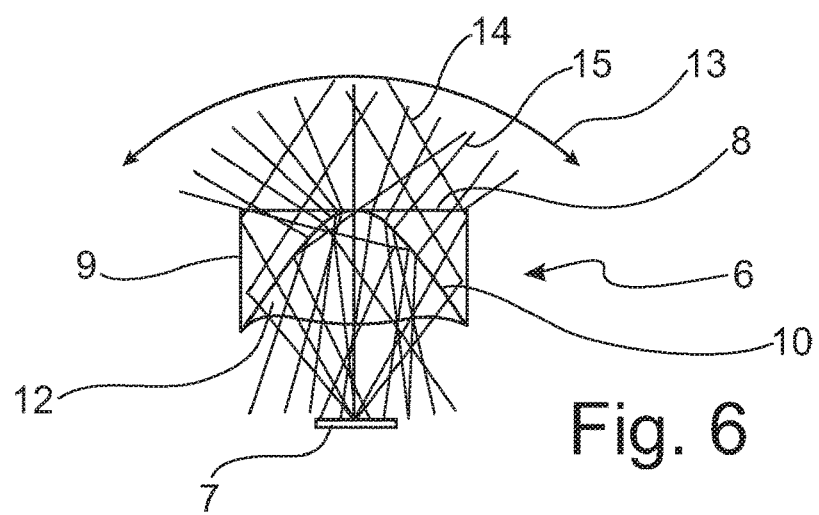
Figure 7:
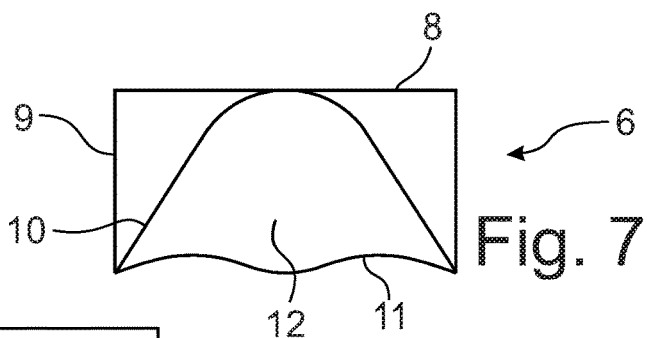
Figure 8:
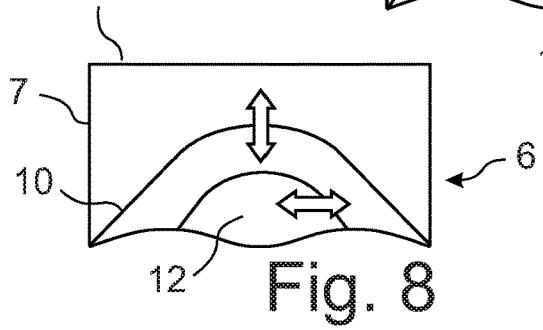
Figure 9:
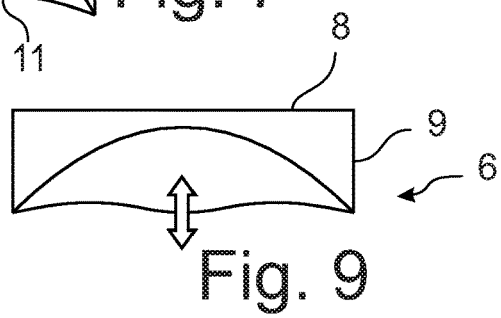
Figure 10:
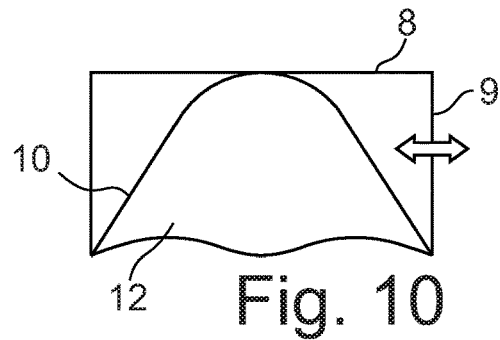
Figure 11:
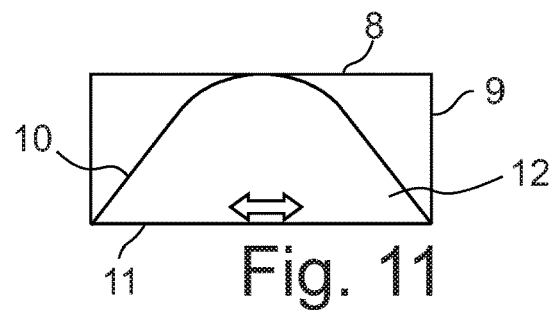
Figure 12:
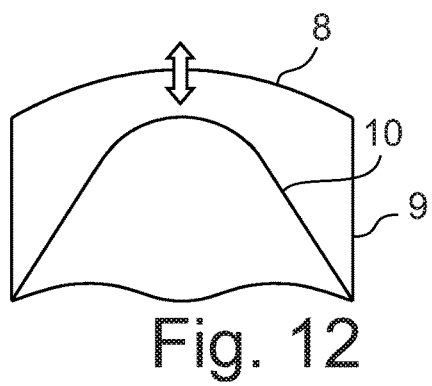
Figure 13:
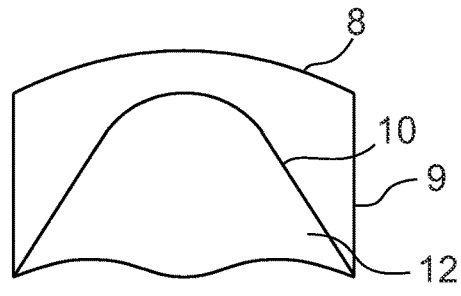
Figure 14:
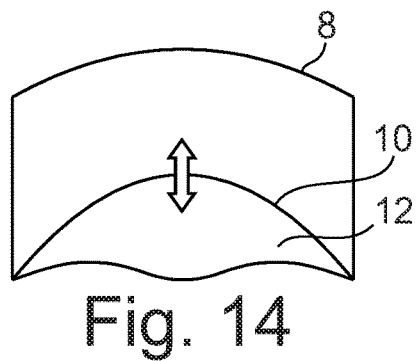
Figure 15:
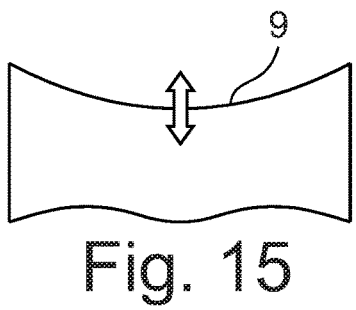

The invention is explained in more detail below on the basis of a preferred exemplary embodiment illustrated in the drawing. The schematic illustrations show in detail:

FIG. 1: a schematic view of a motor vehicle having an ambient light sensor;

FIG. 2: a side view of the structure of the measuring device according to the invention;

FIG. 3: a section through the measuring device according to the invention according to FIG. 2;

FIG. 4: a representation of the optical contour;

FIG. 5: a cross-section through the optical contour according to FIG. 4;

FIG. 6: an illustration of the light beams in the measuring device according to the invention;

FIG. 7: a schematic illustration of the optical element;

FIG. 8: first possible variations of the optical element;

FIG. 9: second possible variations of the optical element;

FIG. 10: third possible variations of the optical element;

FIG. 11: fourth possible variations of the optical element;

FIG. 12: fifth possible variations of the optical element;

FIG. 13: sixth possible variations of the optical element;

FIG. 14: seventh possible variations of the optical element;

FIG. 15: eighth possible variations of the optical element.

FIG. 1 shows a schematic view of a motor vehicle 1 having a windshield 2 and an ambient light sensor having an opening cone 3 arranged behind the windshield 2. This opening cone 3 is in particular wide due to the device according to the invention. The illustration shows the elevation opening cone 3 at azimuth 0°, that is, immediately in front of the vehicle. Line 4 shows a 50% sensitivity. This has an angle of approximately 44° to 90° elevation with the device according to the invention. The line at 5 shows 10% sensitivity and has an angle of approximately 54° to 90° elevation.

FIG. 2 shows a schematic side view of the structure of the measuring device according to the invention. An optical fiber 6 and a detector 7 are arranged behind the windshield 2, which can also be a glass pane in general terms. The optical fiber 6 is arranged directly or with the windshield 2 and in contact therewith. The detector 7 is arranged in the center below the optical fiber 6 at a distance from the optical fiber 6.

FIG. 3 illustrates a section along the line AA in FIG. 2. The light entry side 8 at which the light enters the optical fiber 6 through the windshield 2 is also clearly marked here. The optical fiber 6 has an outer lateral surface 9. The light emission side 11 has a recess 12 in the optical fiber 6, the inner contour of which forms a curved surface 10 in the optical fiber 6. The detector 7 is arranged below the optical fiber 6 centrally below the light emission side 11.

FIG. 4 illustrates the optical contour or the formed curved surface 10 illustrated as a recess 12 in the optical fiber 6. The lateral surface 9 is preferably round, preferably slightly angled, having a radius between 1 mm and 6 mm. The lateral surface 9 particularly preferably has a radius between 3 mm and 6 mm.

FIG. 5 illustrates a view along the line BB in FIG. 4. The recess 12 can be seen inside. The circular lateral surface 9 is illustrated on the outside. The curved surface 10 is roughened on this inside. This roughness was preferably generated by an erosion process.

FIG. 6 illustrates the optical fiber 6 and the detector 7 arranged thereunder. A number of light beams are further illustrated. Overall, the optical fiber 6 achieves a very wide opening angle 13, which is illustrated by the curved line. Some light beams, one of which is identified here by 14, enters the optical fiber 6 on the light incident side 8 and is reflected on the inside of the lateral surface 9, then emerges on the light emission side 11 and is captured by the detector 7. After their entry into the optical fiber 6, other light beams 15 strike the curved surface 10 through the light entry side 8, on which they are scattered by the roughness on the surface and are deflected accordingly and then also partially strike the detector 7. This can take place either when they strike the surface or after they have passed through the inner recess 12 and when they strike the opposite inner surface of the recess 12 having the curved surface 10. In both cases, light beams 14, 15 are directed to the detector 7, which would otherwise not strike the detector 7. Light beams 14, 15 are therefore captured from a very wide opening region and a very large opening angle 13 is taken into account.

In FIG. 7, the optical fiber 6 is depicted in a schematic illustration, wherein in particular here the optical fiber 6 having the light entry side 8, the light emission side 11 and the lateral surface 9 are illustrated. On the light emission side 11, a recess 12 is provided in the optical fiber 6, which recess has a conical shape with a rounded surface or rounded tip. This shape can also be described as Gaussian in cross-section. This curved surface 10 is eroded on the inside. The recess 12 extends over the entire height of the optical fiber 6 and is the widest in the lower region and extends at this widest point over the entire width of the optical fiber 6.

FIG. 8 illustrates a first possible variation of the optical element or the optical fiber 6. The same parts are provided with the same reference numerals in this FIG. 8 and the following figures. It is indicated here that the recess 12 and thus the eroded surface can be enlarged or reduced. That is, the height of the recess 12 and the width of the recess 12 can be adjusted.

FIG. 9 illustrates a second possible variation of the optical element or the optical fiber 6. It is namely shown here that the length of the optical fiber 6 itself, that is, also the length of the lateral surface 9, can be shortened or lengthened accordingly.

As a third possible variation of the optical element or the optical fiber 6, FIG. 10 illustrates that the outer dimensions, that is, in particular the diameter, of the optical fiber 6 can be varied.

FIG. 11 illustrates a fourth possible variation of the optical element or of the optical fiber 6, wherein the lower edge, that is, the light emission side, can in particular be changed.

In the fifth possible variation of the optical element or the optical fiber 6 illustrated in FIG. 12, the light entry side 8 is also formed with a curved surface.

In the sixth possible variation of the optical element or the optical fiber 6 illustrated in FIG. 13, the surface 10, which here forms the light entry side 8, is curved and additionally also eroded. There are therefore two eroded surfaces here, namely the light entry side 8 and also the curved surface 10 of the recess 12.

FIG. 14 illustrates a Seventh possible variation of the optical element or the optical fiber 6, according to which the shape of the inner recess 12 is changed, that is, it is changed to a hemisphere, for example. In this embodiment, both the curved surface 10 and the light entry side 8 are also formed eroded.

FIG. 15 illustrates an eighth possible variation of the optical element or the optical fiber 6, in which there is no inner recess 12, but instead, the light entry side 8 is curved inwards, while the light entry side 8 in FIGS. 12 to 14 is upward, that is, was curved toward the light entry side 8. The light entry side 8 is formed eroded here and in this way also leads to a distribution of the incident light beams 14, 15 and to a trapping of light beams 14, 15 that come from the side, so that there is a comparatively large opening angle.

All features mentioned in the above description and in the claims can be combined in any selection with the features of the independent claim. The disclosure of the invention is thus not restricted to the combinations of features described or claimed; rather, all combinations of features which make sense in the context of the invention are to be regarded as disclosed.

The invention claimed is:

1. A measuring device for capturing ambient light for use in a motor vehicle, having a light-sensitive detector and an optical element which is provided and formed to direct the ambient light onto the detector,
    wherein the optical element has an outer lateral surface, a light entry side and a light emission side,
    at least one of the two sides, the light entry side or the light emission side, has a curved surface,
    the curved surface is roughened to at least 50% and has a higher roughness than the lateral surface of the optical element, so that incoming light is scattered on the curved surface and that the curved surface is formed as an inner contour which forms a recess in the optical element,
    the inner contour has approximately a shape of a cone rounded at the tip, and
    the roughness of the inner contour is greater than 1 μm.

2. The measuring device according to claim 1, wherein the recess has a symmetrical shape.

3. The measuring device according to claim 2, wherein the recess which forms the inner contour is arranged on a side of the optical element which faces the detector.

4. The measuring device according to claim 2, wherein the roughness of the inner contour is greater than 2 μm.

5. The measuring device according to claim 1, wherein the roughness of the inner contour is greater than 4 μm.

6. The measuring device according to claim 1, wherein the roughness of the inner contour is in the range of classes 21 to 42 according to VDI 3400.

7. The measuring device according to claim 1, wherein the optical element is formed as an optical fiber.

8. The measuring device according to claim 1, wherein the lateral surface of the optical element has a roughness between 0.01 μm and 0.5 μm.

9. The measuring device according to claim 1, wherein the inner contour has more than 50% higher roughness than the lateral surface of the optical element.

10. The measuring device according to claim 1, wherein the inner contour extends over almost an entire height of the optical element.

11. The measuring device according to claim 1, wherein the inner contour extends over almost an entire width of the optical element in a region of its greatest lateral extent.

12. The measuring device according to claim 1, wherein a light entry surface of the optical element has a curvature which is curved towards the light entry side and has a higher roughness than the lateral surface of the optical element.

13. The measuring device according to claim 1, wherein the optical element has a shape which tapers in a direction of the light entry side.

14. A rain-light sensor for use on the windshield of a motor vehicle having a sensor for detecting water drops on a windshield and a measuring device for capturing ambient light, wherein
    the measuring device for capturing the ambient light is the measuring device according to claim 1.

15. The rain-light sensor according to claim 14, wherein a light sensor specific to a travel direction having a detection cone pointing in the travel direction is arranged in the rain-light sensor.

16. A motor vehicle having a windshield and the measuring device according to claim 1 arranged on an inside of the windshield for capturing the ambient light.

17. The motor vehicle according to claim 16, wherein the motor vehicle has a rain-light sensor for use on the windshield of the motor vehicle, wherein the rain-light sensor has a sensor for detecting water drops on the windshield.

18. The measuring device according to claim 1, wherein the roughness of the inner contour is in the range of classes 33 to 42 according to VDI 3400.

19. The measuring device according to claim 1, wherein the lateral surface of the optical element has a roughness between 0.01 μm and 0.05 μm.

20. A measuring device for capturing ambient light for use in a motor vehicle, comprising:
    a light-sensitive detector; and
    an optical element which is provided and formed to direct ambient light onto the detector,
    wherein the optical element has an outer lateral surface, a light entry side and a light emission side,
    at least one of the two sides, the light entry side or the light emission side, has a curved surface,
    the curved surface is roughened to at least 50% and has a higher roughness than the lateral surface of the optical element, so that incoming light is scattered on the curved surface and that the curved surface is formed as an inner contour which forms a recess in the optical element,
    the inner contour has approximately a shape of a cone rounded at the tip,
    the roughness of the inner contour is greater than 1 μm, and the inner contour extends in a region of its greatest lateral extend, which is on a side that is associated with the detector, over more than 70% of a width of the optical element.

* * * * *